5 Sheets—Sheet 2.
E. HUBER & F. STROBEL.
Grain Separator and Thrasher.
No. 231,803.        Patented Aug. 31, 1880.
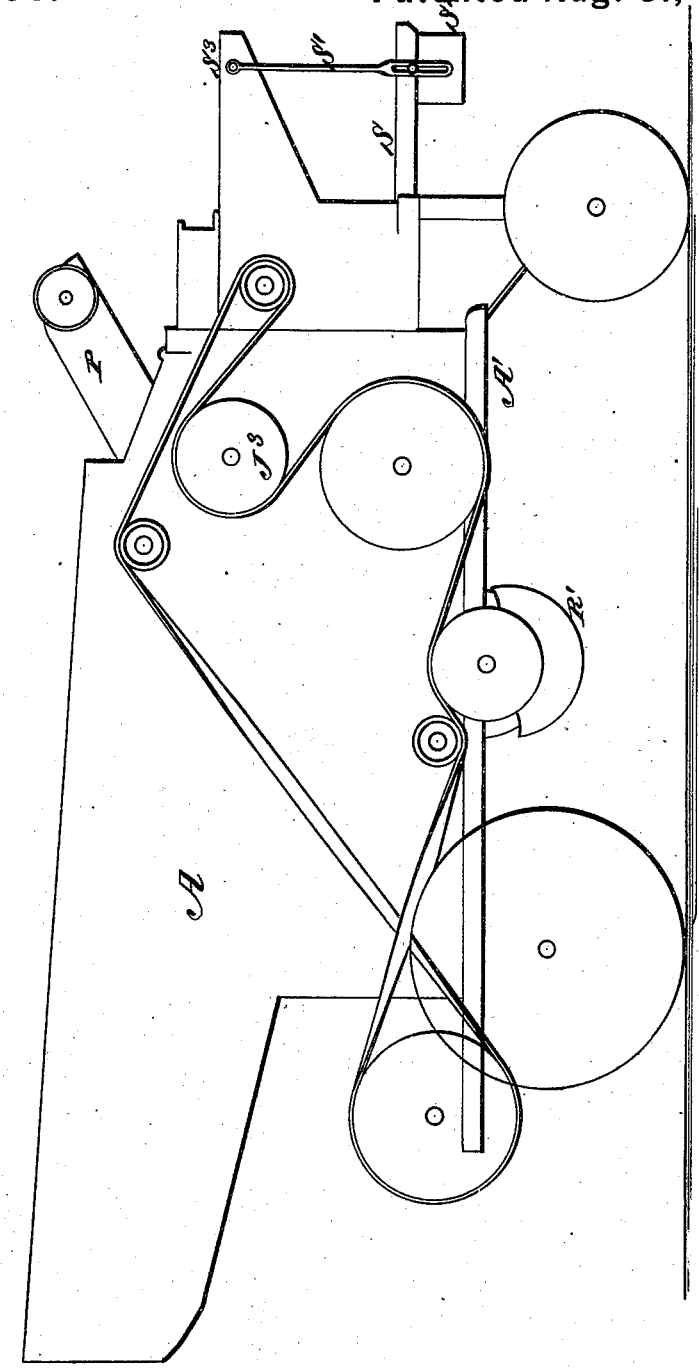
WITNESSES
Robert Everett
Chas. G. Page
INVENTORS
Edward Huber &
Fredrick Strobel.
Gilmore Smith & Co. ATTORNEYS

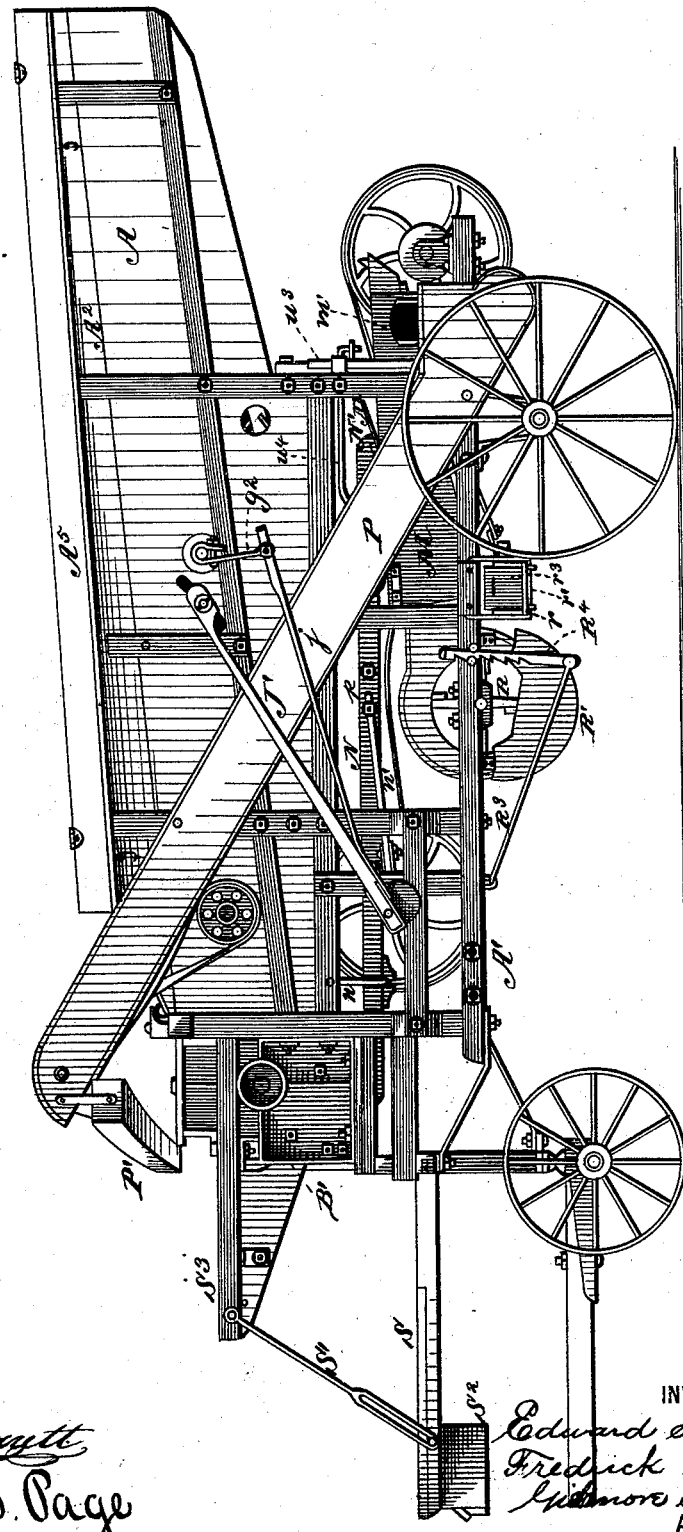

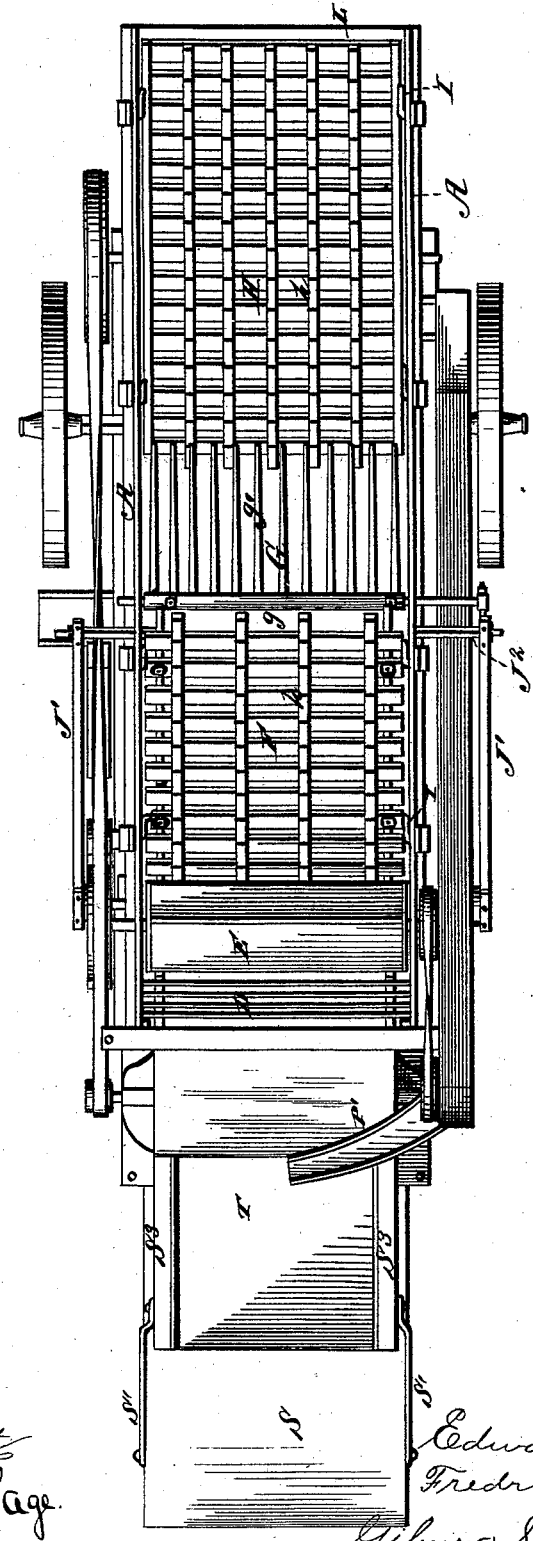

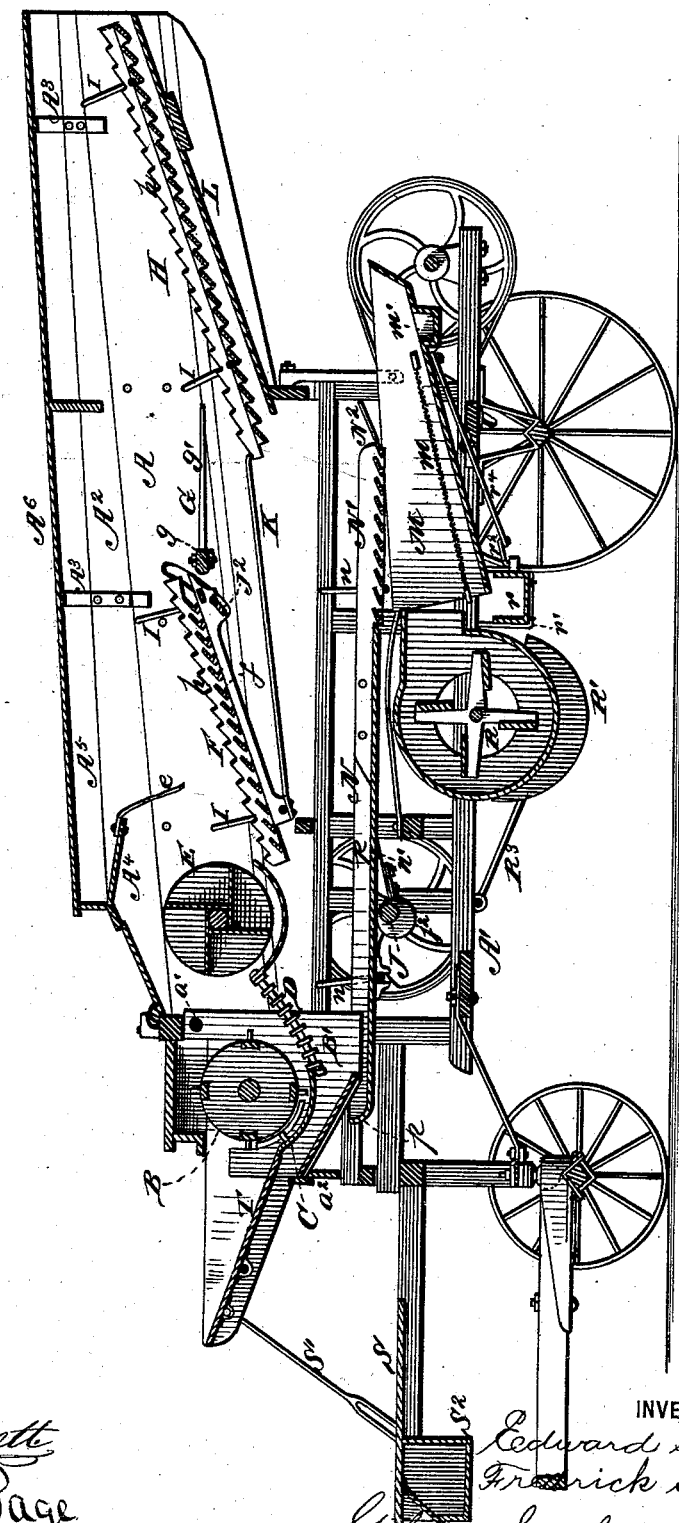

5 Sheets—Sheet 5.
E. HUBER & F. STROBEL.
Grain Separator and Thrasher.
No. 231,803. Patented Aug. 31, 1880.
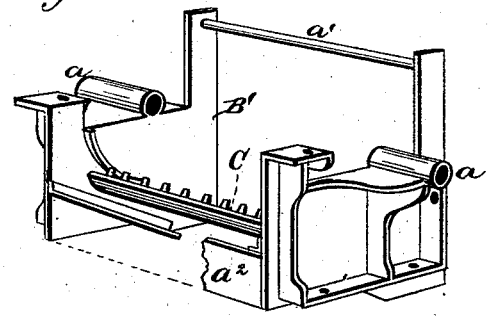
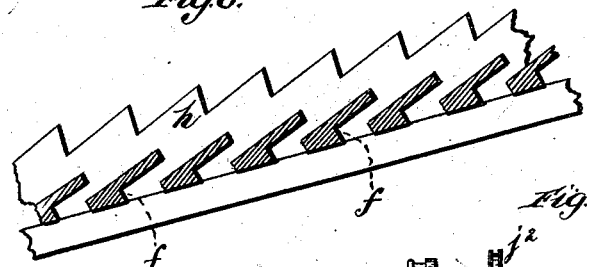
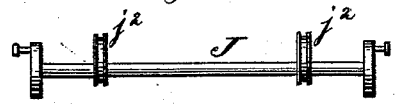
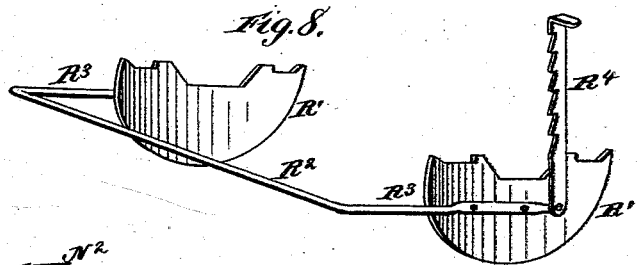
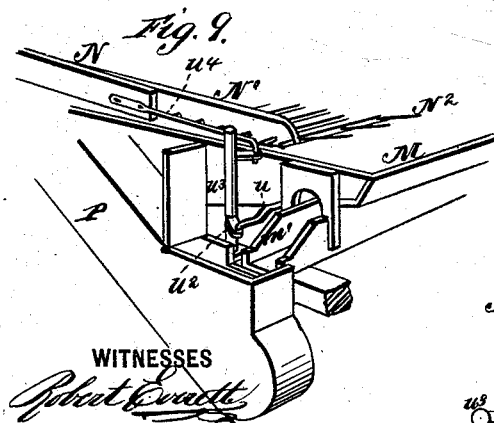
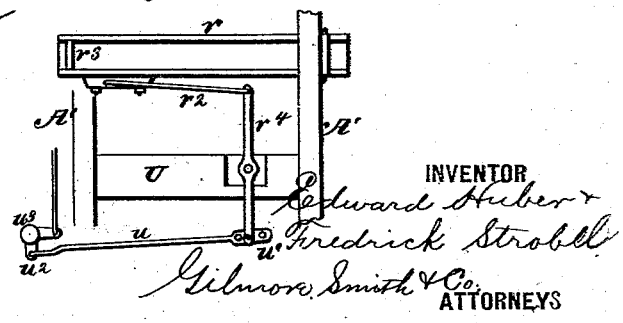

UNITED STATES PATENT OFFICE.

EDWARD HUBER AND FREDRICK STROBEL, OF MARION, OHIO.

GRAIN SEPARATOR AND THRASHER.

SPECIFICATION forming part of Letters Patent No. 231,803, dated August 31, 1880.

Application filed February 14, 1880.

*To all whom it may concern:*

Be it known that we, EDWARD HUBER and FREDRICK STROBEL, of Marion, in the county of Marion and State of Ohio, have invented certain new and useful Improvements in a Grain Separator and Thrasher; and we do hereby declare that the following is a full, clear, and exact description of the construction and operation of the same, reference being had to the annexed drawings, making a part of this specification, and to the letters and figures of reference marked thereon.

Figure 1 of the drawings is a side elevation of our improved grain thrasher and separator. Fig. 2 is a side elevation of the machine in outline, illustrating the system of driving-wheels and belt. Fig. 3 is a top or plan view with the deck or covering of the machine removed. Fig. 4 is a central longitudinal section taken on a vertical plane through the machine. Fig. 5 is a perspective view of the metal frame which carries the cylinder and concave. Fig. 6 illustrates, in a sectional view of a portion of one of the slatted reciprocating frames, the notched bars and stops. Fig. 7 shows the main crank-shaft with its cranks and cams. Fig. 8 illustrates the regulating blast-boards with their adjuncts. Fig. 9 illustrates, in perspective, a lower corner of the machine. Fig. 10 illustrates the conveyer and its actuating devices.

Our invention relates to grain thrashers and separators; and it consists in the construction and arrangement of parts, as will be first fully described in the following specification, and next clearly pointed out in the claims.

In the annexed drawings, Fig. 2 principally illustrates, in outline, the main frame, the supporting and driving wheels, and the arrangement of the endless belt for transmitting power to the several driving-wheels of our improved grain thrasher and separator.

For a more particular description of the main frame with its removable covering reference is made to Figs. 1 and 4. In these figures the sides A of the main frame are represented as being braced by an arrangement of bars or timbers, of which the requisite number of the vertical ones extend down below the said sides, so as to connect with the side bars, A', of the supporting and running frame. Between the running frame and the vibrating bottom, which is suspended from the sides of the machine, ample space is left for the fan-cylinder, riddle, and shaking-shoe, all of which will be described in detail in their proper place.

The removable covering of the machine consists, essentially, of the side boards, $A^2$, connected together by cross-bars $A^3$, and by a board, $A^4$, at the forward ends of the side boards, the whole constituting a frame which is closed at the top by covers $A^5$, hinged to a center board, $A^6$, which is rigidly secured to the frame. This covering, when fitted upon the main frame, will be held in place by the downwardly-projecting ends of the bars $A^3$, which rest against the inner walls of the sides A, and by the upwardly-projecting ends of the vertical timbers upon said sides, against which the side boards, $A^2$, will lie. It is evident, however, that other obvious mechanical means may be used for securing down the said covering. Either the doors of this covering may be opened, or when it is desirable access may be had to the interior of the machine by removing the entire frame.

Referring now in detail to the operative parts of the machine, B designates the thrashing-cylinder, which is of the ordinary construction, and journaled in the journal-bearings $a$, formed in a metal frame, B'. This independent metal frame is strengthened by the cross-bars $a'$ $a^2$, which connect its vertical walls, and which are respectively located in horizontal planes above and below the cylinder. The frame B' is formed with suitable flanges, (see Fig. 3,) through which bolts are passed, so as to bolt it in place to the frame-work which constitutes the forward end of the main frame. The usual concave C is also properly secured within the frame B', which may be readily detached from the frame-work of the machine by loosening the bolts.

This construction and arrangement of an independent frame carrying the cylinder and concave greatly facilitate the manufacture of this class of machines and enable an operator to have ready access to the parts for purposes of repair. In forming the said frame of metal the swelling and shrinkage incident to a wooden frame, and the consequent derangement of parts, are obviated.

The concave, which is of the usual construction, is supplemented by a grain-grate, D, comprising a series of slats extending transversely across the machine. This grain-grate extends from the concave nearly to a rotary beater, E. This rotary beater is composed of a series of slats or wings arranged upon a common axis, as shown in the sectional view, Fig. 4, and secured at their ends to disks, one of which is shown in the said figure. The beater is rotated in an opposite direction to the cylinder, in order to receive the straw and grain which come from the cylinder and pass the same over instead of under, so as to deliver the straw and grain down upon an inclined reciprocating slatted frame F. When sheaves are fed into the cylinder the most of the thrashed grain will be delivered through the concave and the series of grate-slats, while the flying grain will be arrested by the revolving beater E, which, by its reverse motion on the under side of the straw, will separate and deliver the grain in the angles of the beater, from whence the straw and grain will be delivered on the inclined reciprocating slatted frame F. The object of arranging and running the beater in such direction is to secure the downward motion of the flying grain, and for effectually preventing it from passing beyond the beater and above the slatted frame, we provide an apron, e, which consists of a flexible strip of some suitable material secured to the inclined board A$^4$.

In machines in which the straw and grain pass under the beater the tendency is to raise the grain to the top of the straw, thus necessitating a second working down through the straw in the process of separating.

The inclined reciprocating slatted frame F receives the straw and grain from the rotating beater and thoroughly shakes, agitates, and at the same time moves it forward to the vibrating finger-bar G, over which it passes and is thoroughly agitated and dropped down to a second reciprocating slatted frame, H, where the separation is fully completed, and the straw delivered at the tail end of the machine to the straw-stacker.

The reciprocating slatted frames are composed of a series of slats running transversely across the interior of the machine and set at an angle of about thirty degrees, inclining upwardly toward the rear of the machine. Secured to the top of the series of slats, and parallel with the length of the machine, are a series of notched wooden bars, h, the whole being secured firmly to form a rigid frame, which is suspended so as to move freely by double-crank swing-rods I. By employing swing-rods of this construction a number of joints and connections are avoided and a simple, effective, and economical device produced.

The slats of the reciprocating frame F are each provided with a stop or shoulder, f, which is formed upon the under side of the slat and extending its entire length. The construction of these stops or shoulders will be understood by referring to Fig. 6. These stops prevent the straw passing through the frame, which being inclined, the ends of the straw which is being worked forward will necessarily, during any dropping back, abut against said stops, and hence be checked from passing through the frame. At the same time these stops do not in anywise prevent the free passage of the grain between the slats.

Motion is communicated to the reciprocating slatted frame F by means of a double crank-shaft, J, (see Figs. 4 and 7,) and suitable pitman-connections J', which are attached to a cross-bar, J$^2$, which extends across the width of the machine and projects out through slots in its sides. The cross-bar J$^2$ is bolted to the under side of the slatted frame at its upper end. As shown in Fig. 2, the wheel J$^3$ of the system of belt-wheels illustrated in said figure is mounted upon the shaft J, whereby it is rotated during the travel of the belt.

The vibrating finger-bar G consists of a head, g, with a series of fingers, g'. One of the journals of the head of this finger-bar extends out through the sides of the main frame of the machine for the purpose of attaching to it an arm or crank, g$^2$, which is actuated by a pitman, j, connecting at its lower end with one of the pitmen J' of the crank-shaft J.

The second inclined reciprocating slatted frame, H, is constructed similarly to the first-described slatted frame, and is operated by rigid pitman-connections K from the first-described frame F. This frame H is also suspended by double-crank swing-rods journaled in the main frame and arranged similarly to the swing-rods I.

Below the second inclined reciprocating slatted frame, H, is a stationary inclined bottom, L, which is securely fastened to the main frame and employed for the purpose of collecting any grain which may be separated from the straw and conveying it to the fan-shoe M by reason of the backward motion of the reciprocating slatted frame H.

The grain and chaff which are forced through the concave and grain-grate by the action of the cylinder, and also the grain and chaff which will be separated from the straw by the action of the beater, slatted frames, and vibrating finger-bar, are received by a reciprocating bottom, N, which has a suitable end-shake movement, which brings the chaff and grain forward to a contracted slatted extension, N', attached to the said reciprocating bottom, and which delivers the grain over the middle of the riddle m.

The slats of the extension N' are provided with stops or shoulders constructed and arranged like those illustrated in Fig. 6. These stops of said extension prevent straw from passing to the riddle, but permit the grain to pass freely to the same.

The straw and rubbish are carried on forward over the extension N', and are held up by a series of wires or fingers, N², fastened to the outer slat of the extension N', where the blast will carry such straw and rubbish over the riddle.

The unthrashed heads or white caps are carried over the riddles by the action of the blast into a spout, m', which deposits them in an elevator, P, of ordinary construction, in which they are conveyed up and discharged into a spout, P', which conducts them to the cylinder.

The grain is separated from the chaff while dropping through, and from the riddles by the combined action of a blast and the vibrations of the shoe.

The reciprocating bottom N is provided with an end and side strips $p$, to prevent waste and littering, and is suspended by double-crank swing-rods $n$. The lateral vibrations of this bottom are effected through the medium of pitman-connections $n'$, each of which is connected by a band with one of the cams $j^2$ upon the shaft J.

The fanning-mill is provided with fans R, and is of the usual construction. The grain is delivered from the fanning-mill shoe M into a conveying box or spout, $r$, which is suspended in swinging links $r'$, and provided with a small end gate, $r^2$. This gate is made removable from the spout, so that it can be placed in the end opposite to that from which the grain is being discharged.

In order to extend either end of the box $r$ beyond the side of the machine, in order to facilitate the discharge of grain from the end so extended, the pitman $r^2$, which vibrates the box, is adjustably connected therewith, (see Fig. 10,) and hence by shifting the connection along the box the latter will be thrown to either side, as required.

The pitman $r^2$ connects with a rock-bar, $r^4$, which is pivoted to a cross-bar, U, properly joined at its ends to the bars or sills A' of the lower or running frame hereinbefore described.

The connection-rod $u$, which actuates the rock-bar $r^4$, and hence imparts the requisite shaking motion to the conveyer $r$, is secured at its end $u'$ to the shoe M, so that it will, during operation, impart to the shoe a like shaking movement.

The rod $u$ connects at its other end with an arm, $u^2$, of a vibratory shaft, $u^3$, which is actuated by a connecting-rod, $u^4$, which is attached at one end to the vibratory bottom N. Hence the movements of the conveyer and the shoe are due to the vibrations of the said bottom N, which is in turn actuated through the means already set forth.

In order to regulate the blast the fanning-mill is provided at its ends with the regulating blast-boards R'. These are worked simultaneously by a rod, R², extended across the machine and hinged to the sill thereof. Said rod has an arm, R³, at each end, and these arms are fastened to the boards or valves R', whereby the said boards are suspended, so as to have a common movement. In order to adjust the boards or valves R' so as to vary the area of the openings at the ends of the fanning-mill, a rack-bar, R⁴, is pivoted to one of the arms R³ or to the board, if preferred, and the said rack-bar is arranged to engage with any suitable stud upon the sill of the machine.

The foot-board S is as ordinarily constructed, and is arranged to slide under the cylinder-frame. When not in use it is held in place by a drop or locking pin, and when extended for use the inner ends of its side bars are placed on suitable tenons or in recesses formed in a cross-timber of the running-frame, while the outer end of the foot-board will be supported by means of rod S'. These rods have their upper ends pivoted to arms or bars S³, which are alongside of the feed-board, while their lower ends are slotted and fitted upon studs on the sides of the foot-board, thus allowing the foot-board to be pushed back under the cylinder-frame.

A tool-box, S⁵, is secured under the foot-board, and by reason of its location the entrance of dirt therein is prevented.

The feed-board T is pivoted about its center so as to be tilted or reversed in position, in order to form, in connection with the cylinder-cap, a complete protection for the cylinder and concave against rain or snow should the machine be left exposed to the weather.

Having thus described our invention, what we claim is—

1. The beater E, running the reverse of the cylinder, in combination with the open grain-grates and reciprocating slatted frame F, substantially as specified.

2. The combination of the blast-fans journaled on the horizontal sills of the machine with the shutters R, connected by a rod, R² R³, and the vertical rock-bars R⁴, adapted to hold the shutters in their adjustment, as set forth.

3. In a grain thrasher and separator, the combination of the bars S³ at the forward end of the main frame with the sliding foot-board S, adapted to be extended for use or shoved beneath the machine, and its slotted supporting-rods S'', hinged at their upper ends to the bars S³, as shown and set forth.

4. The combination of the apron $e$ with the cylinder, grain-grates, reciprocating slatted frame, and a beater running the reverse of the cylinder, substantially as specified.

In testimony that we claim the above we have hereunto subscribed our names in the presence of two witnesses.

EDWARD HUBER.
FREDRICK STROBEL.

Witnesses:
J. E. DAVIDS,
CHAS. J. HOYT.